(12) United States Patent
Park et al.

(10) Patent No.: US 9,455,425 B2
(45) Date of Patent: Sep. 27, 2016

(54) BATTERY MODULE

(75) Inventors: Shi-Dong Park, Yongin-si (KR);
Tae-Yong Kim, Yongin-si (KR);
Kang-Sik Jung, Yongin-si (KR)

(73) Assignees: Samsung SDI Co., Ltd., Yongin-si (KR); Robert Bosch GmbH, Stuttgart (DE)

(*) Notice: Subject to any disclaimer, the term of this patent is extended or adjusted under 35 U.S.C. 154(b) by 948 days.

(21) Appl. No.: 13/049,724

(22) Filed: Mar. 16, 2011

(65) Prior Publication Data
US 2012/0115004 A1 May 10, 2012

(30) Foreign Application Priority Data
Nov. 5, 2010 (KR) .................. 10-2010-0109833

(51) Int. Cl.
| H01M 10/50 | (2006.01) |
| H01M 10/00 | (2006.01) |
| H01M 2/10 | (2006.01) |
| H01M 10/0525 | (2010.01) |
| H01M 10/0565 | (2010.01) |

(52) U.S. Cl.
CPC ........... *H01M 2/1061* (2013.01); *H01M 2/105* (2013.01); *H01M 2/1083* (2013.01); *H01M 10/0525* (2013.01); *H01M 10/0565* (2013.01); *Y02E 60/122* (2013.01); *Y02T 10/7011* (2013.01)

(58) Field of Classification Search
CPC ................... H01M 2/0245; H01M 10/1094
See application file for complete search history.

(56) References Cited

U.S. PATENT DOCUMENTS

| 3,420,489 A * | 1/1969 | Doggett ................. B60R 16/04 180/68.5 |
| 3,623,917 A * | 11/1971 | Chassoux ........... H01M 2/1077 429/148 |
| 3,846,179 A * | 11/1974 | Shaw ............................. 429/99 |
| 4,520,887 A * | 6/1985 | DiFazio ............. H01M 2/1083 180/68.5 |
| 5,766,801 A | 6/1998 | Inoue et al. |
| 6,312,851 B1 * | 11/2001 | Fukuda et al. ................ 429/176 |
| 6,761,992 B1 * | 7/2004 | Marukawa .......... H01M 2/1077 429/159 |
| 7,125,628 B2 | 10/2006 | Marukawa et al. |
| 7,955,082 B1 * | 6/2011 | Gause .......................... 434/248 |
| 8,336,064 B2 * | 12/2012 | Masuda ........................ 720/655 |
| 2008/0102332 A1 * | 5/2008 | Choi et al. ...................... 429/23 |
| 2009/0087720 A1 | 4/2009 | Okabe et al. |
| 2009/0193624 A1 * | 8/2009 | Sue et al. ........................ 16/386 |
| 2010/0215998 A1 * | 8/2010 | Byun et al. ..................... 429/82 |

(Continued)

FOREIGN PATENT DOCUMENTS

| EP | 1990861 | * 11/2008 | ........... H01M 10/50 |
| JP | 09-120808 A | 5/1997 | |

(Continued)

OTHER PUBLICATIONS

Machine English Translation of JP2009-129580A, 33 pages.

*Primary Examiner* — Ula C Ruddock
*Assistant Examiner* — Amanda Barrow
(74) *Attorney, Agent, or Firm* — Lewis Roca Rothgerber Christie LLP

(57) ABSTRACT

A battery module includes a plurality of rechargeable batteries, end plates at outer sides of the rechargeable batteries; fixing members fixed to the end plates, each fixing member having a support step protruding from at least one side end, a reinforcement member contacting the fixing member, and a fastener fixing the fixing member and the reinforcement member to the end plate.

14 Claims, 9 Drawing Sheets

(56) References Cited

U.S. PATENT DOCUMENTS

| | | |
|---|---|---|
| 2010/0266887 A1 | 10/2010 | Sekino et al. |
| 2011/0117409 A1* | 5/2011 | Lee et al. ............... 429/99 |
| 2011/0151299 A1* | 6/2011 | Park et al. .............. 429/99 |
| 2011/0151309 A1* | 6/2011 | Park et al. .............. 429/151 |
| 2011/0159348 A1* | 6/2011 | Park ............... H01M 2/1077 |
| | | 429/151 |
| 2012/0040237 A1* | 2/2012 | Hamada et al. ........ 429/159 |
| 2012/0115011 A1* | 5/2012 | Kim ................ H01M 2/1077 |
| | | 429/156 |

FOREIGN PATENT DOCUMENTS

| | | | |
|---|---|---|---|
| JP | 2003-36830 A | 2/2003 | |
| JP | 2008-181765 | * 8/2008 | ............ H01M 2/10 |
| JP | 2008-218124 A | 9/2008 | |
| JP | 2009-129580 A | 6/2009 | |
| KR | 10-2007-0048893 A | 5/2007 | |
| KR | 10-2007-0101025 A | 10/2007 | |
| KR | 1020070048893 A | * 10/2007 | |
| KR | 10-2010-0055477 | 5/2010 | |
| WO | WO 2010123091 A1 | * 10/2010 | |

* cited by examiner

BATTERY MODULE

CROSS-REFERENCE TO RELATED APPLICATION

This application claims priority to and the benefit of Korean Patent Application No. 10-2010-0109833, filed in the Korean Intellectual Property Office on Nov. 5, 2010, the entire content of which is incorporated herein by reference.

BACKGROUND

1. Field

The described technology relates generally to a battery module.

2. Description of Related Art

A rechargeable battery differs from a primary battery in that it can be repeatedly charged and discharged, while the latter generally makes only the irreversible conversion of chemical to electrical energy. A low-capacity rechargeable battery is used as the power supply for small electronic devices, such as cellular phones, notebook computers, and camcorders, while a high-capacity rechargeable battery is used as the power supply for driving motors, for example, in hybrid vehicles, electric vehicles, and the like.

Recently, high power rechargeable batteries that include a non-aqueous electrolyte having a high energy density have been developed. Such a large capacity rechargeable battery may include a plurality of rechargeable batteries, allowing the large capacity battery to be used to drive devices requiring a large amount of power, for example, for motors in hybrid vehicles and electric vehicles.

A large capacity rechargeable battery generally includes a plurality of rechargeable batteries that are coupled in series. The large capacity rechargeable battery may have cylindrical or angular shapes.

A large capacity rechargeable battery may include two end plates that hold the battery module together. When the rechargeable battery supported by a pair of end plates, and a fixing member that fixes end plates is not stably fixed, the rechargeable battery may be damaged due to external impact. Generally, a fixing member is fixed to the end plates by a bolt or the like, and the fixing member is formed with synthetic resin to reduce weight. The bolt is inserted through the fixing member and thus the bolt contacts the fixing member. When the rechargeable battery is expanded (e.g., due to external impact or heat), force resulting from the bolt holding the module together is further increased, possibly causing damage to the fixing member.

The above information disclosed in this Background section is only for enhancement of understanding of the background of the described technology and therefore it may contain information that does not form the prior art that is already known in this country to a person of ordinary skill in the art.

SUMMARY

An embodiment of the present invention provides a battery module having rechargeable batteries that are stably fixed.

A battery module according to one aspect of an embodiment of the present invention includes a plurality of rechargeable batteries arranged in a first direction, end plates at outer sides of the rechargeable batteries, and fixing members extending along the first direction and fixed to the end plates. Each of the end plates has a support step protruding from one side end, a reinforcement member in contact with an end plate, and a fastener fixing the fixing member and the reinforcement member to the end plate.

The fastener may penetrate the end plate and the fixing member, and the reinforcement member may be fixed to the support step.

The end plate may include a pressing plate perpendicular to the first direction and a fastening plate extending in the first direction at a side end of the pressing plate, and the fastener may penetrate the fastening plate. The fixing member may include a vent hole (i.e., vent opening) allowing a coolant to flow between the rechargeable batteries.

The end plate may include a pressing plate perpendicular to the first direction and fastening plates at upper and lower ends of the pressing plate. The end plate may be bent at both sides to form the fastening plates. The fastener may penetrate through the fastening plate.

The end plate includes a first fixing hole, the fixing member includes a second fixing hole, and the reinforcement member includes a third fixing hole. The fastener may penetrate through the first fixing hole, the second fixing hole, and the third fixing hole. The second fixing hole may be larger than the third fixing hole. The first fixing hole and the third fixing hole may be the same size.

The second fixing hole may be longer in the first direction than the first fixing hole. The second fixing hole may have first and second portions connected via a third portion that is narrower than the first and second portions.

The thickness of the reinforcement member may be greater than that of the fixing member. The reinforcement member may be formed with a material that is stronger than that of the fixing member.

The fixing member may include a support plate and a support step protruding from the support plate. A first fixing hole may be formed in the support plate. The fixing member may be bent at a side end to form the support step.

The reinforcement member may include a base and a protruding portion extending from a side end of the base. The protruding portion may be adjacent and parallel to the support step. The reinforcement member may be slidable with respect to the fixing member.

According to an exemplary embodiment, the reinforcement member is provided so that the rechargeable batteries can be stably fixed.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
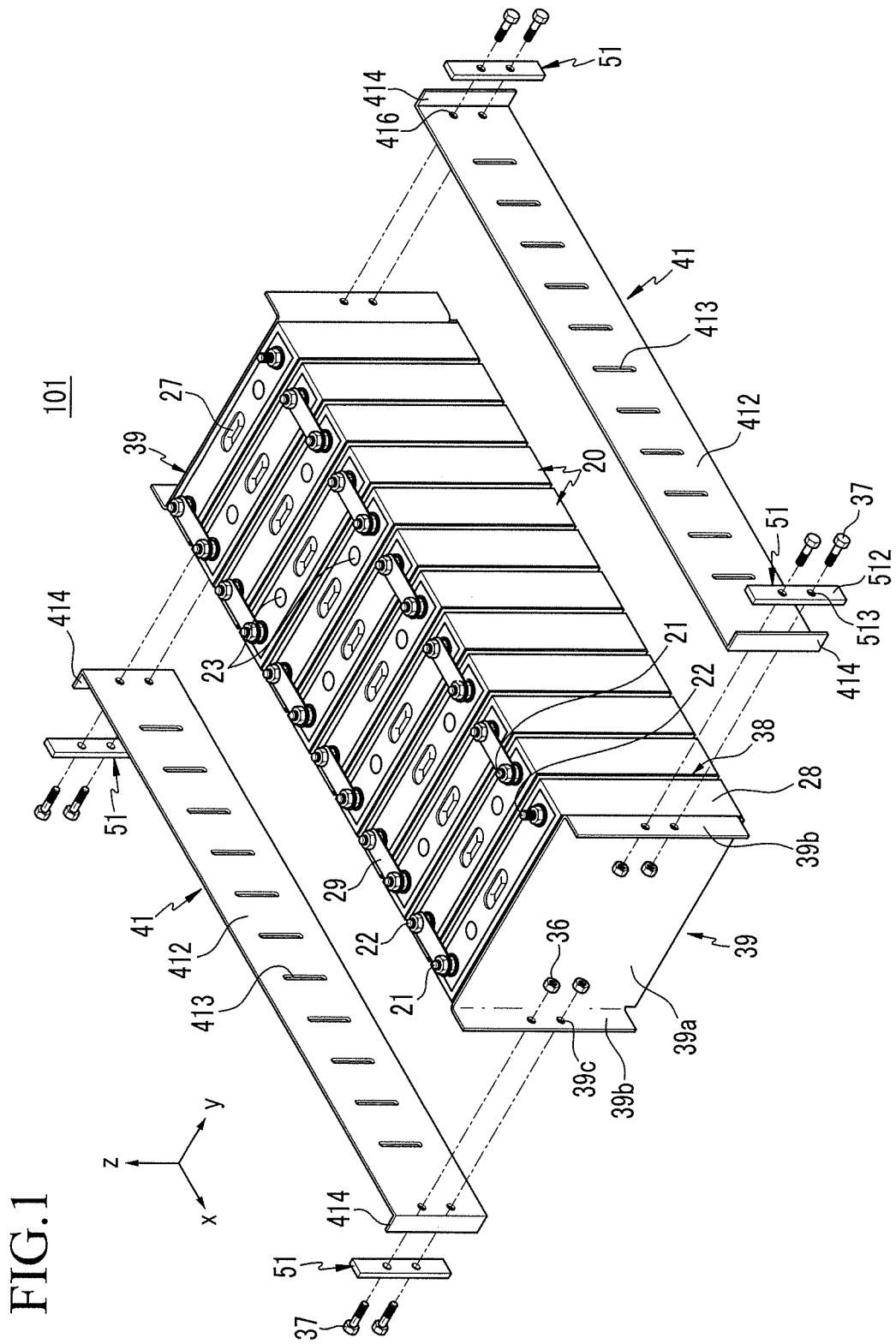
FIG. 1 is an exploded perspective view of a battery module according to a first exemplary embodiment.

The following detailed description references certain exemplary embodiments, examples of which are illustrated in the accompanying drawings. Throughout the description, like reference numerals refer to like elements. In this regard, the described embodiments are exemplary, and those of ordinary skill in the art will appreciate that certain modifications can be made to the described embodiments. This description is not limited to the particular embodiments described.

Figure 2:
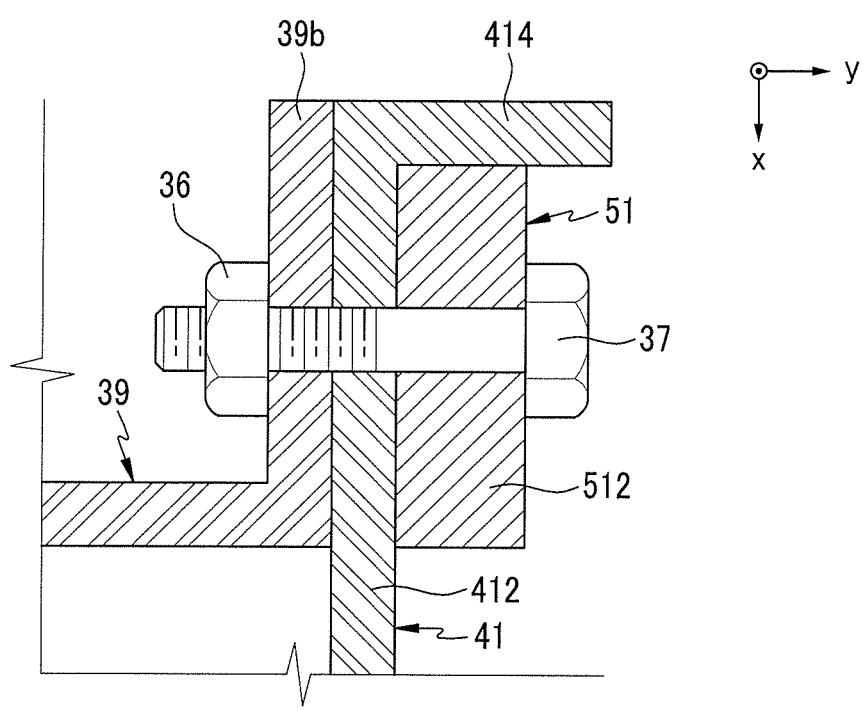
FIG. 2 is a partial cross-sectional view of the battery module according to the first exemplary embodiment.

FIG. 1 is a perspective view of a battery module according to a first exemplary embodiment, and FIG. 2 is a partial cross-sectional view of the battery module according to the first exemplary embodiment.

Referring to FIG. 1 and FIG. 2, a battery module 101 according to the first exemplary embodiment includes a plurality of rechargeable batteries 20, barrier ribs 38 between the rechargeable batteries 20, end plates 39 at external sides of the plurality of rechargeable batteries 20, and fixing members 41 connecting the end plates 39.

The rechargeable battery 20 depicted in FIG. 1 is a quadrangle-type lithium ion rechargeable battery. However, the present invention may be applicable to various types of batteries such as a lithium polymer battery, a cylindrical battery, and the like.

The rechargeable battery 20 includes a case 28 in which an electrode assembly is installed. A positive terminal 21 and a negative terminal 22, connected to an electrode assembly, protrude outside of the case 28. In addition, the rechargeable battery 20 further includes a vent member 27 and a sealing cap 23 sealing an electrolyte solution inlet. The vent member 27 may include a notch formed to be opened at a set or predetermined pressure level to emit gas.

The case 28 is formed in a substantially cubic prismatic shape, and is formed of a metal such as aluminum or an aluminum alloy. Each of the positive terminals 21 is electrically connected with a positive electrode of an electrode assembly and each of the negative terminals 22 is electrically connected with a negative electrode of an electrode assembly. The positive terminals 21 and the negative terminals 22 protrude from an upper side of the rechargeable battery 20.

The plurality of rechargeable batteries 20 are layered (e.g., stacked) in parallel along a side direction (x-axis direction of FIG. 1) such that wide sides of the rechargeable batteries 20 face each other.

The rechargeable batteries 20 are coupled in series by bus-bars 29. Positive terminals 21 and negative terminals 22 of neighboring rechargeable batteries 20 are arranged in a crossed manner. In other words, the rechargeable batteries are arranged such that a positive terminal 21 of one battery is adjacent to a negative terminal 22 of an adjacent battery. A bus-bar 29 is provided to electrically connect the positive terminal 21 of one rechargeable battery 20 and the negative terminal 22 of its neighboring rechargeable battery 20. The bus-bars 29 are plate shaped and are fixed to the respective positive terminal 21 and the respective negative terminal 22 by nuts.

The barrier rib 38 is square plate shaped and may have a plurality of protrusions thereon to form coolant passages, for example, between adjacent batteries. In other words, the barrier ribs 38 form space between rechargeable batteries 20 so that a coolant can flow between the rechargeable batteries.

End plates 39 are respectively positioned at the most outer sides (i.e., at the outermost ends of the module 101) of the layered rechargeable batteries 20 and press the rechargeable batteries 20 toward the inner side thereof. The end plate 39 includes a pressing plate 39a that contacts the wide side of each of the outermost rechargeable batteries 20 and supports the rechargeable batteries 20 by pressing them toward the inner side. The end plate 39 also includes a fastening plate 39b at both side ends of the pressing plate 39a. The end plates 39 may be bent at an end to form the pressing plate 39a. Alternatively, the pressing plate 39a and the fastening plate 39b may be separate pieces that are fixed together, using welding or other suitable fixing methods. One or more first fixing holes (or openings) 39c are formed in the fastening plate 39b. The first fixing holes 39c allow for the insertion of one or more fasteners 37.

The end plates 39 are fixed by a fixing member 41 that supports the end plates 39. The fixing member 41 extends along the layering direction of the rechargeable batteries 20 (x-axis direction of FIG. 1; i.e., along the short sides of the rechargeable batteries 20) and both ends of the fixing member 41 are fixed to respective end plates 39.

The fixing member 41 includes a support plate 412 and support steps 414 protruding from both side ends thereof. The support plate 412 is rectangular and extends along the layering direction of the rechargeable batteries 20 (i.e., in the x-axis direction or along the short sides of the rechargeable batteries 20). A vent hole 413 is formed in the support plate 412 to allow for movement of a coolant, and the vent holes 413 correspond to the space formed by the barrier ribs 38.

One or more second fixing holes 416 are formed near both edges of the support plate 412 along the length direction (x-axis direction of FIG. 1), and at each edge, the second fixing holes 416 are separately arranged in a width direction (z-axis direction of FIG. 1) of the fixing member 41. That is, as shown in FIG. 1, two sets of second fixing holes 416 are vertically aligned at opposite ends of the support plate 412.

The fixing member 41 is fixed to the fastening plate 39b using the fastener 37 and a nut 36 coupled thereto. In the present exemplary embodiment, the fastener 37 is a bolt. However, the present invention is not limited thereto, and the fastener 37 may be a rivet, a pin, or the like.

The support steps 414 externally protrude from ends of the support plate 412. The fixing member 41 is bent such that the support steps 414 and the support plate 412 meet at the bend (i.e., the fixing member 41 is bent at both ends to form the support steps 414). In the present exemplary embodiment, the support steps 414 protrude from both ends of the support plate 412, but the present invention is not limited thereto. For example, the support step 414 may be formed only at one end of the support plate 412. If the fixing member 41 only includes one support step 414, a reinforcement member 51 is provided only at an end of the support plate 412 where the support step is formed.

A reinforcement member 51 is located at an outer side of the fixing member 41 and is a base 512 including one or more third fixing holes 513 through which the fastener 37 is inserted. The reinforcement member 51 is in contact with an edge of the fixing member 41 and also may be in contact with and thus fixed to the support step 414. Accordingly, the fastener 37 penetrates the reinforcement member 51, the fixing member 41, and the end plate 39. The reinforcement member 51 is formed to be thicker than the fixing member 41 to support the end plate 39. An external circumferential surface of the reinforcement member 51 contacts the support steps 414 such that the reinforcement member 51 and the support steps 414 surface-contact each other, and accordingly, a force transferred to the reinforcement member 51 can be diffused to the support steps 414.

In FIG. 1, the reinforcement members 51 are provided at both edges of the fixing member 41 to fix the end plate 39. However, the present invention is not limited thereto, and the reinforcement member 51 may be located only at one edge of the fixing member 41.

The reinforcement member 51 may be separated from the support step 414, that is, there may be a space between the reinforcement member 51 and the support step 414 in the initial installation state. When the rechargeable batteries 20 expand, the second fixing hole 416 is enlarged or stretched and the reinforcement member 51 may contact and be supported by the support steps 414. Whether a space is present between the reinforcement member 51 and the support step 414 in the initial installation state or not, during operation of the battery module 101, the fixing member 41 supports the end plate 39, and the reinforcement member 51 and the support step 414 support the end plate 39.

As described, according to the present exemplary embodiment, the reinforcement member 51 and the fixing member 41 are coupled together by the fastener 37. As such, the reinforcement member 51 and the fixing member 41 support the end plate 39, further stably supporting the end plate 39. While the rechargeable batteries 20 are iteratively charged and discharged, the one or more rechargeable batteries 20 may expand due to gas generated from respective rechargeable batteries 20. This expansion may cause strong pressure to be applied to the fixing member 41. During expansion, the fixing member 41 and the fastener 37 point-contact each other at a second fixing hole 416 and pressure is concentrated at the point-contact portion so that the fixing member 41 may be damaged. However, according to the present exemplary embodiment, the reinforcement member 51 also supports the pressure due to the fastener 37. The pressure transferred to the reinforcement member 51 is supported by the support steps 414, and accordingly the rechargeable batteries 20 can be supported.

Further, since the reinforcement member 51 is provided, the fixing member 41 may be formed with light-weighted engineering plastic instead of heavy metal so that the weight of the battery module 101 can be reduced.

Figure 3:
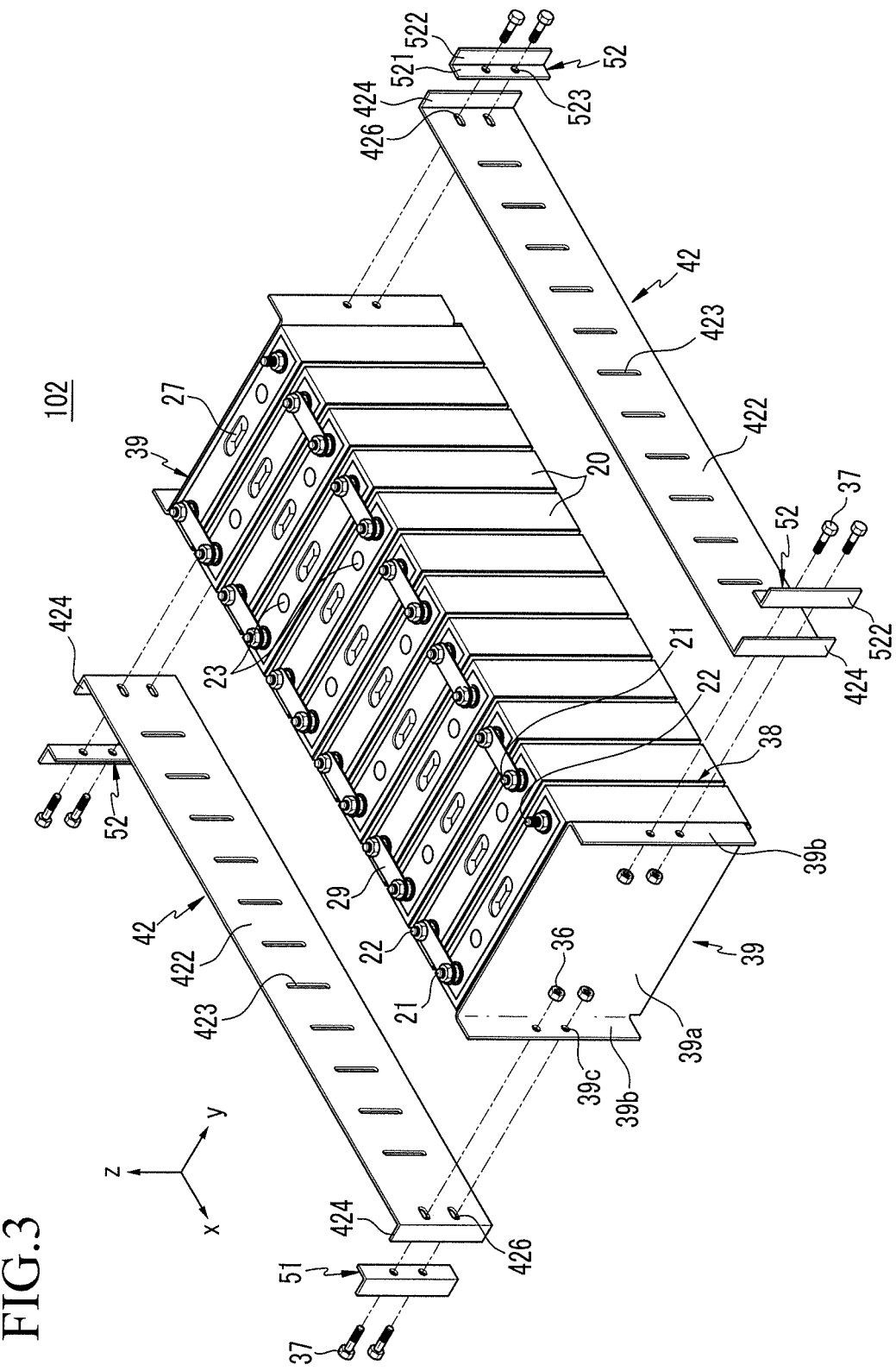
FIG. 3 is an exploded perspective view of a battery module according to a second exemplary embodiment.
Figure 4:
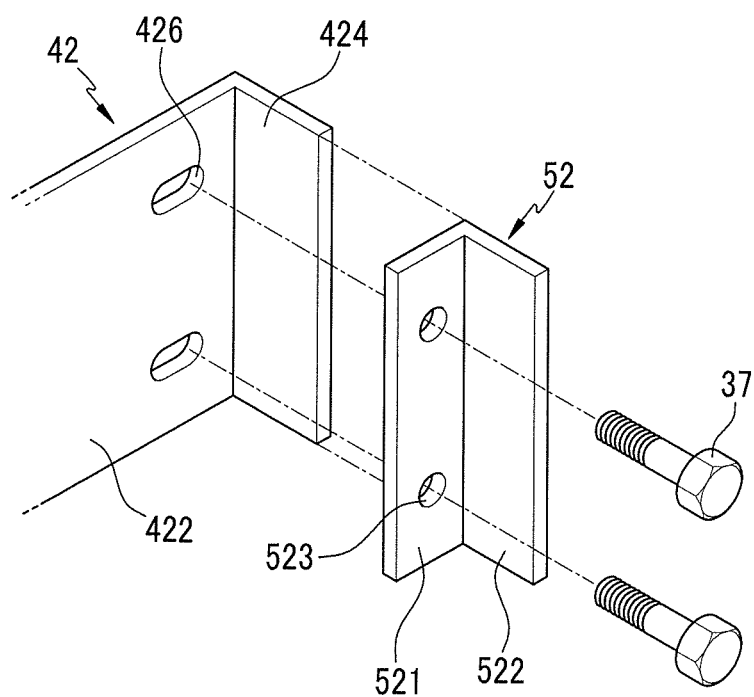
FIG. 4 is an exploded perspective view of a fixing member and a reinforcement member of the battery module according to the second exemplary embodiment.

FIG. 3 is a perspective view of a battery module according to a second exemplary embodiment, and FIG. 4 is an exploded perspective view of a fixing member and a reinforcement member of the battery module according to the second exemplary embodiment.

Referring to FIG. 3 and FIG. 4, a battery module 102 according to the second exemplary embodiment includes a plurality of rechargeable batteries 20, barrier ribs 38 between the rechargeable batteries 20, end plates 39 at external sides of the rechargeable batteries 20, and fixing members 42 connecting the end plates 39.

The battery module 102 according to the present exemplary embodiment is the same as the battery module of the first exemplary embodiment, except for the structure of the fixing member 42 and the reinforcement member 52, and therefore a description for the same structure will not be provided.

The end plates 39 are respectively located at the outer sides of the outermost rechargeable batteries 20, and two fixing members 42 are respectively fixed to both side ends of the end plates 39.

The end plate 39 includes a pressing plate 39a that contacts the rechargeable batteries 20 and supports the rechargeable batteries 20 by pressing them toward the inner side and a fastening plate 39b at both side ends of the pressing plate 39a. The end plate 39 may be bent at the sides such that the pressing plate 39a and the fastening plate 39b meet at the bend (i.e., the end plate 39 may be bent at the sides to form pressing plates 39a). One or more first fixing holes 39c are formed in the fastening plate 39b for insertion of a fastener 37.

The fixing members 42 extend in the layering direction (x-axis direction of FIG. 3) of the rechargeable batteries 20, and both ends of each of the fixing members 42 are fixed to respective fastening plates 39b.

The fixing member 42 includes a support plate 422 and support steps 424 respectively protruding from both side ends of the support plate 422. The support plate 422 is rectangular and extends along the layering direction of the rechargeable batteries 20 (i.e., along the x-axis direction of FIG. 3). One or more second fixing holes 426, in which the fastener 37 is inserted, are formed at both edges of the support plate 422 in the length direction, and the second fixing holes 426 at each edge are separately arranged in a width direction (z-axis direction of FIG. 3) of the fixing member 42. The second fixing hole 426 is larger than the first fixing hole 39c, and is extended in the layering direction (x-axis direction) of the rechargeable batteries 20. In other words, as depicted in FIG. 4, the second fixing hole 426 may be roughly oval shaped.

The fixing member 42 is fixed to the fastening plate 39b formed at a side end of the end plate 39 through the second fixing hole 426 using the fastener 37 and a nut 36. In the present exemplary embodiment, the fastener 37 is a bolt.

The support steps 424 externally protrude from an end of the support plate 422. According to the present exemplary embodiment, the fixing member 42 is bent such that the support steps 424 meet the support plate 422 at the bends (i.e., the fixing member 42 may be bent at both sides to form the support steps 424).

A reinforcement member 53 is at an outer side of the fixing member 42. The reinforcement member 53 includes one or more third fixing holes 533 through which the fastener 37 is inserted, thereby fixing the reinforcement member 53 together with the fixing member 42 and the end plate 39.

The third fixing hole 523 is smaller than the second fixing hole 426, and in the present exemplary embodiment, the third fixing hole 523 and the first fixing hole 39c are the same size. Accordingly, the reinforcement member 52 moves together with the end plate 39.

The reinforcement member 52 includes a base 521 contacting the support plate 422 and facing the same, and a protruding portion 522 protruding from one end of the base 521. The third fixing hole 523 is formed in the plate-shaped base 521. The reinforcement member 52 is bent such that the protruding portion 522 and the base 521 meet at the bend, and the protruding portion protrudes outward (i.e., the reinforcement member 52 is bent to form the protruding portion 522). The protruding portion 522 point-contacts the support steps 424 to diffuse a force transferred to the reinforcement member 52.

The reinforcement member 52 is formed of a material that is stronger than the fixing member 42. Therefore, the fixing member 42 may be formed of, for example, engineering plastic and the reinforcement member 52 may be formed of, for example, metal.

Figure 5:
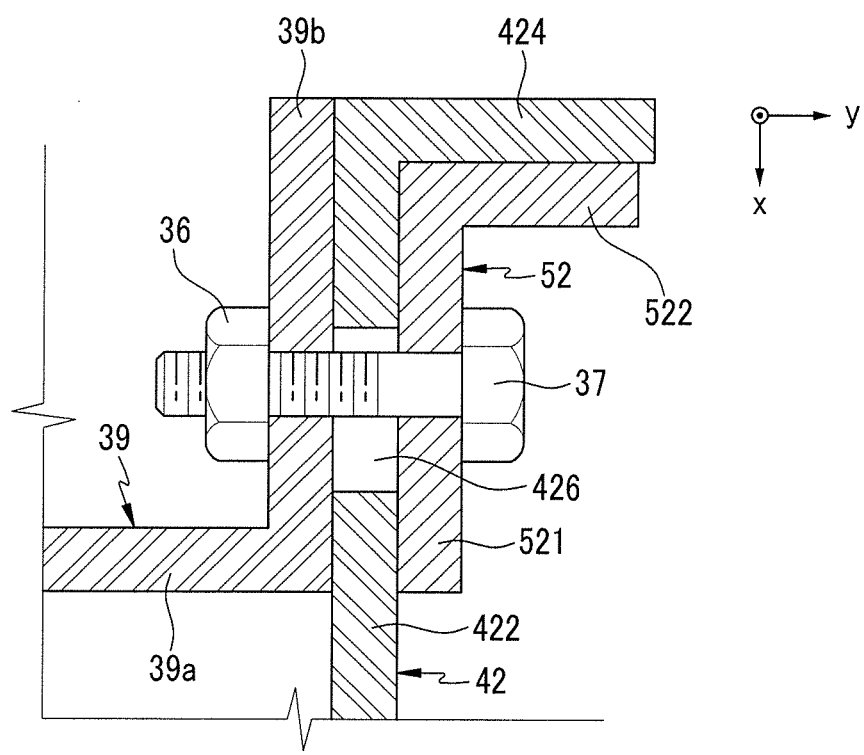
FIG. 5 is a partial cross-sectional view of the battery module according to the second exemplary embodiment.

As shown in FIG. 5, the reinforcement member 52 may be separated from the support step 424 in the initial installation state and the fastener 37 may extend through the second fixing hole 426. In this case, the end plate 39 is supported by friction between the fastening plate 39b and the support plate 422.

When the rechargeable batteries 20 expand, as shown in FIG. 5, the fastener 37 is pushed to the outside (i.e., in the x-axis direction) due to the pressure and thus the end plate 39 and the reinforcement member 52 also move together to the outside. The fastener 37 moves until the reinforcement member 52 contacts the support step 424, and therefore the reinforcement member 52 supports the fastener 37 when contacting the support step 424.

As described, according to the present exemplary embodiment, when the rechargeable battery 20 expands, the end plate 39 is pushed backward such that excessive pressure due to the expansion of the rechargeable battery 20 can be reduced, and the end plate 39 is supported by the reinforcement member 52 so that the end plate 39 can be further stably fixed.

Figure 6:
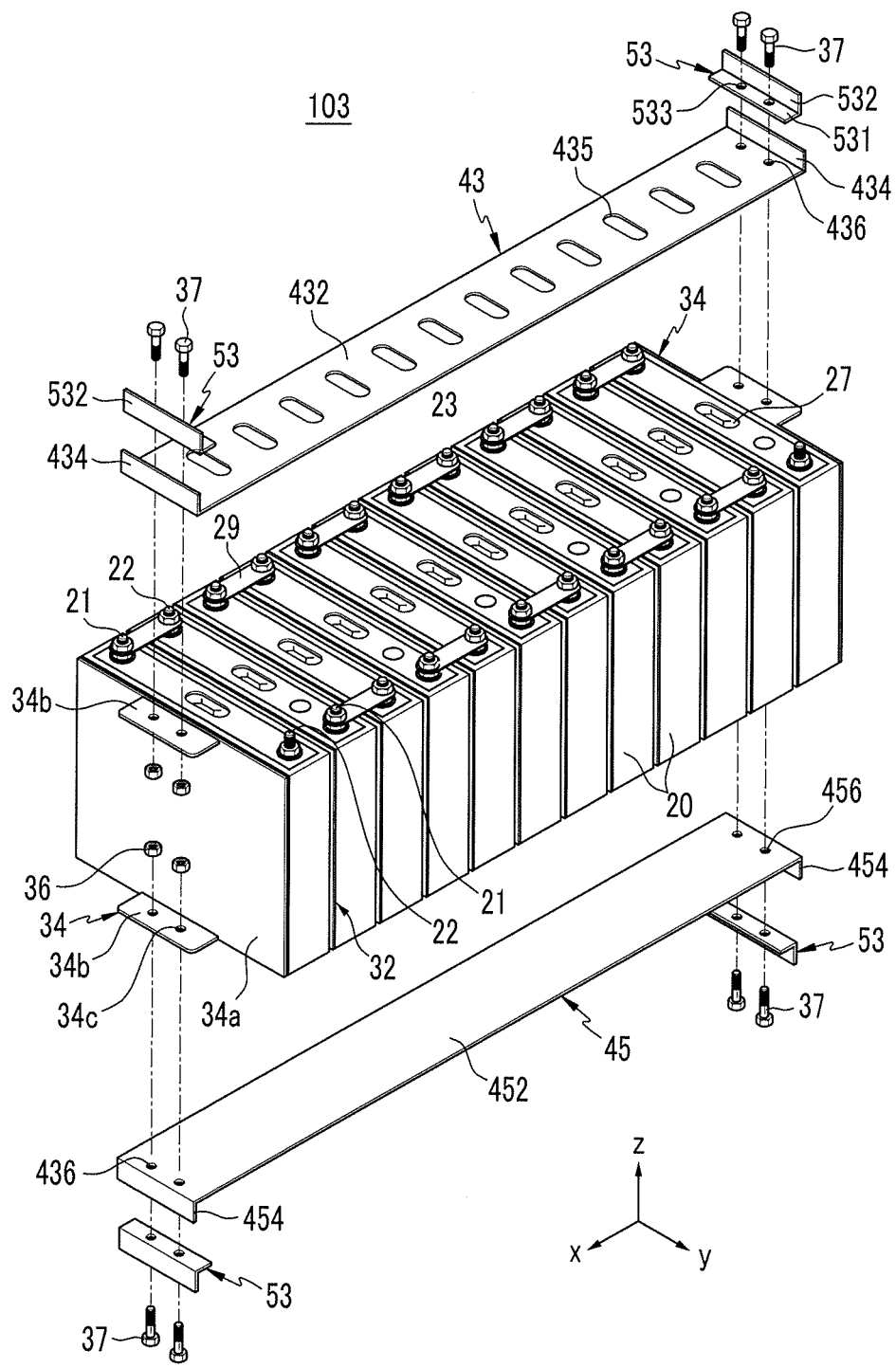
FIG. 6 is an exploded perspective view of a battery module according to a third exemplary embodiment.

FIG. 6 is an exploded perspective view of a battery module according to a third exemplary embodiment.

Referring to FIG. 6, a battery module 103 according to the third exemplary embodiment includes a plurality of rechargeable batteries 20, barrier ribs 38 between the rechargeable batteries 20, end plates 34 at external sides of the rechargeable batteries 20, and fixing members 42 connecting the end plates 39.

The battery module 103 of the present exemplary embodiment is the same as the battery module of the first exemplary embodiment, except for the structure of the fixing members 43 and 45 and the reinforcement member 53, and therefore a description for the same structure will not be provided.

The end plates 34 are respectively located at the most outer sides of the layered rechargeable batteries 20, and two fixing members 43 and 45 are fixed to respective sides of end plates 34.

The end plate 34 includes a pressing plate 34a supporting the rechargeable batteries 20 by pressing the rechargeable batteries 20 to the inside and fastening plates 34b respectively bent to the outside at upper and lower ends of the end plate 34. One or more first fixing holes 34c are formed in the fastening plate 34b for insertion of the fastener 37.

The fixing members 43 and 45 are respectively provided at the upper and lower ends of the end plate 34, and the fixing members 43 and 45 extend in the layering direction (x-axis direction) of the rechargeable batteries 20 both above and below the battery module 103. Both ends of each of the fixing members 43 and 45 are fixed to respective end plates 34. The upper fixing member 43 is at the upper portion of the battery module 103 and the lower fixing member 45 is at the lower portion of the battery module 103.

The upper fixing member 43 includes a support plate 432 and support steps 434 protruding outward from both side ends of the support plate 432. The support plate 432 is rectangular and extends along the layering direction of the rechargeable batteries 20 (i.e., in the x-axis direction of FIG. 6). Second fixing holes 436 are formed at both edges in a length direction of the support plate 432 and a plurality of second fixing holes 436 are arranged at each edge in a width direction (y-axis direction) of the upper fixing member 43. The upper fixing member 43 is fixed to the fastening plate 34b at the upper end of the end plate 34 through the second fixing holes 416 using the fastener 37 and a nut 36.

A vent hole 435 is formed in the support plate 432 of the upper fixing member 43, and the vent hole 435 corresponds to a vent member 27 of the rechargeable battery 20. Accordingly, internal gas of the rechargeable battery 20 can be easily emitted through the vent hole 435 when the vent member 27 is opened. The support steps 434 externally protrude from each end of the support plate 432. The fixing member 43 may be bent at the ends such that the support steps 434 meet the support plate 432 at the bend (i.e., the fixing member 43 may be bent at the ends to form the support steps 434).

The lower fixing member 45 includes a support plate 452 and support steps 454 protruding from both side ends of the support plate 452. The support plate 452 is rectangular and extends along the layering direction (i.e., the x-axis direction) of the rechargeable batteries 20. One or more second fixing holes 456 are formed at each edge (x-axis direction) of the support plate 452 in length direction. Second fixing holes 456 at each end are separately arranged in a width direction (y-axis direction) of the lower fixing member 45. The lower fixing member 45 is fixed to the fastening plate 34b formed at the lower end of the end plate 34 through the second fixing holes 456 using the fastener 37 and a nut 36. The support steps 454 externally protrude from each end of the support plate 452. The fixing member 45 may be bent at the ends such that the support steps 454 meet the support plate 452 at the bend (i.e., the fixing member 45 may be bent at both ends to form the support steps 454).

A reinforcement member 53 is included at an outer side of each of the fixing members 43 and 45. The reinforcement member includes one or more third fixing holes 533 through which the fastener 37 is inserted, and each reinforcement member 53 is fixed together with one of the fixing members 43 and 45 to the end plate 34 by a fastener 37.

The reinforcement member 53 includes a base 531 contacting one of the support plates 432 and 452 and facing the same, and a protruding portion 532 protruding from one end of the base 531. The third fixing holes 533 are formed in the plate-shaped base 531. The reinforcement member 53 is bent such that the protruding portion 532 meets the base 531 at the bend (i.e., the reinforcement member 53 is bent to form the protruding portion 532). Each of the protruding portions 532 point-contact respective support steps 434 to diffuse a force transferred to each of the reinforcement members 53.

Figure 7:
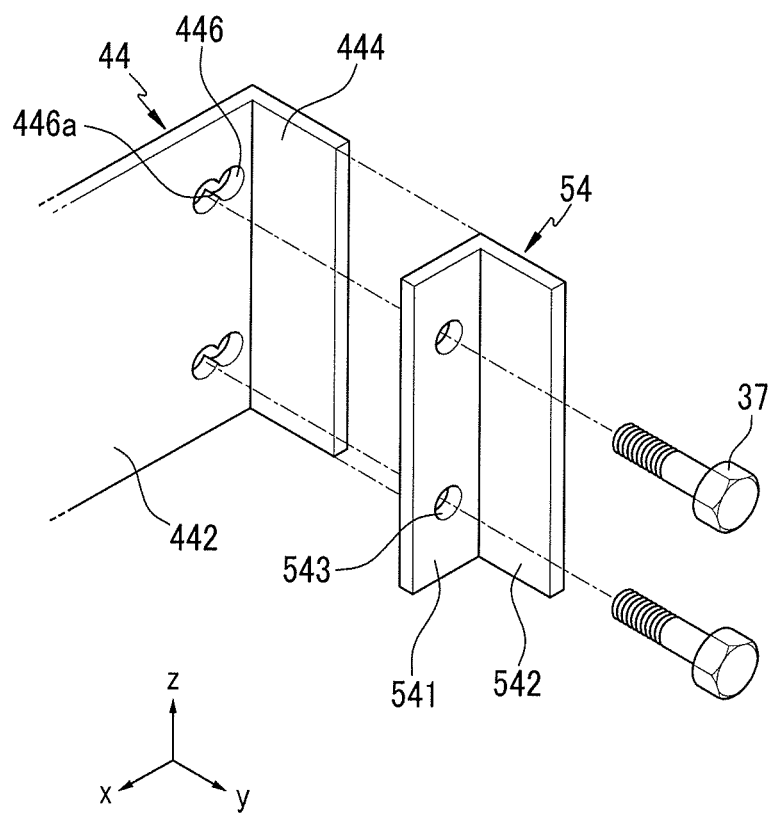
FIG. 7 is an exploded perspective view of a fixing member and a reinforcement member of a battery module according to a fourth exemplary embodiment.

FIG. 7 is an exploded perspective view of a fixing member and a reinforcement member of a battery module according to a fourth exemplary embodiment.

Referring to FIG. 7, the battery module according to the present exemplary embodiment is the same as the battery module of the second exemplary embodiment, except for the a structure of the fixing member 44, and therefore a description for the same structure will not be provided.

The fixing member 44 extends in the layering direction (x-axis direction of FIG. 3) of the rechargeable batteries 20, and both ends thereof are respectively fixed to end plates 39.

The fixing member 44 includes a support plate 442 and support steps 444 protruding from both side ends of the support plate 442. The support plate 442 is rectangular and extends along the layering direction of the rechargeable batteries 20. Second fixing holes 446 are formed at both edges in the length direction thereof, and a plurality of second fixing holes 446 at each edge are distanced from each other along a width direction (z-axis direction of FIG. 7) of the fixing member 44.

The second fixing hole 446 is larger than a first fixing hole formed in the end plate, and extends along the layering direction (x-axis) direction of the rechargeable batteries 20. A protrusion protruding at the inner side of the second fixing hole 446 is formed therein. For example, as shown in FIG. 7, a protrusion may extend from the top and bottom of the second fixing hole 446 near the middle of the second fixing hole 446. In other words, the second fixing hole 446 may have first and second portions connected via a third portion that is narrower than the first and second portion.

The fixing member 44 is fixed to a fastening plate 39b formed at a side end of the end plate 39 through the second fixing hole 446 using the fastener 37 and a nut 36. In the present exemplary embodiment, the fastener 37 is a bolt.

The support step 444 externally protrudes from an end of the support plate 442. The fixing member 44 is bent such that the support step 444 meets the support plate 442 at the bend (i.e., the fixing member 44 is bent at both ends to form the support steps 444).

A reinforcement member 54 is located at an external surface of the fixing member 44. The reinforcement member 54 includes a third fixing hole 543 for insertion of the fastener 37. The reinforcement member 54 is fixed to the end plate 39 together with the fixing member 44 by the fastener 37.

The third fixing hole 543 is smaller in size than the second fixing hole 446, and is the same size as the first fixing hole 39c. Accordingly, the reinforcement member 54 moves together with the end plate 39. The reinforcement member 54 includes a base 541 contacting the support plate 442 and a protruding portion 542 protruding from one side end of the base 541. A third fixing hole 543 is formed in the plate-shaped base 541. The reinforcement member 54 is bent such that the protruding portion 542 meets the base 541 at the bend (i.e., the reinforcement member 54 is bent to form the protruding portion 542). The protruding portion 542 may point-contact the support steps 444 to diffuse a force transferred to the reinforcement member 54.

Figure 8A:
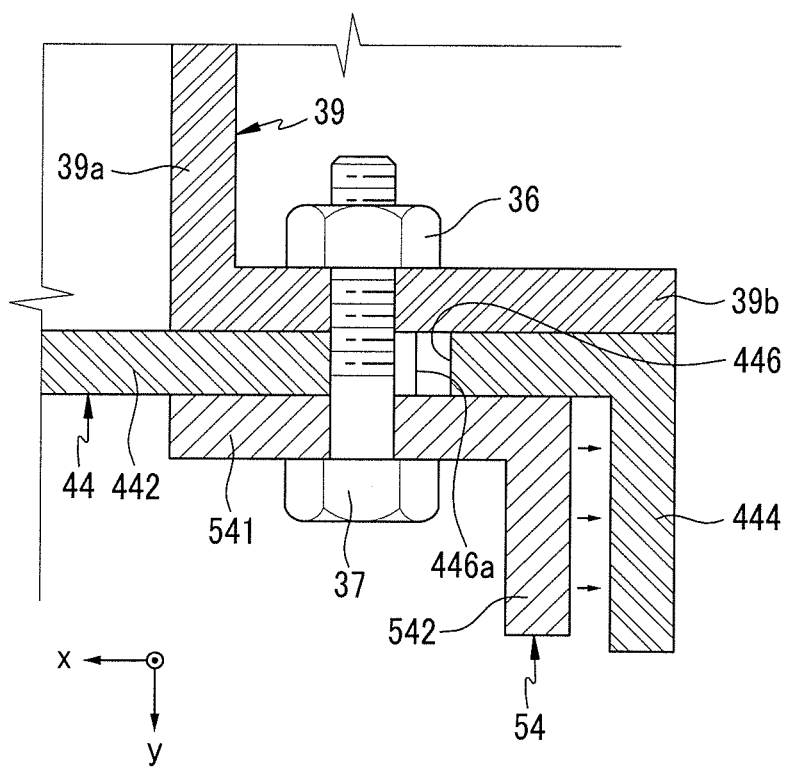
FIG. 8A is a partial cross-sectional view of an initial installation state of a fixing member in a battery module according to a fourth exemplary embodiment.

As shown in FIG. 8A, the reinforcement member 54 is separated from the support step 444 in the initial installation state, and the fastener 37 extends through the second fixing hole 446 and is supported by a protrusion 446a.

Figure 8B:
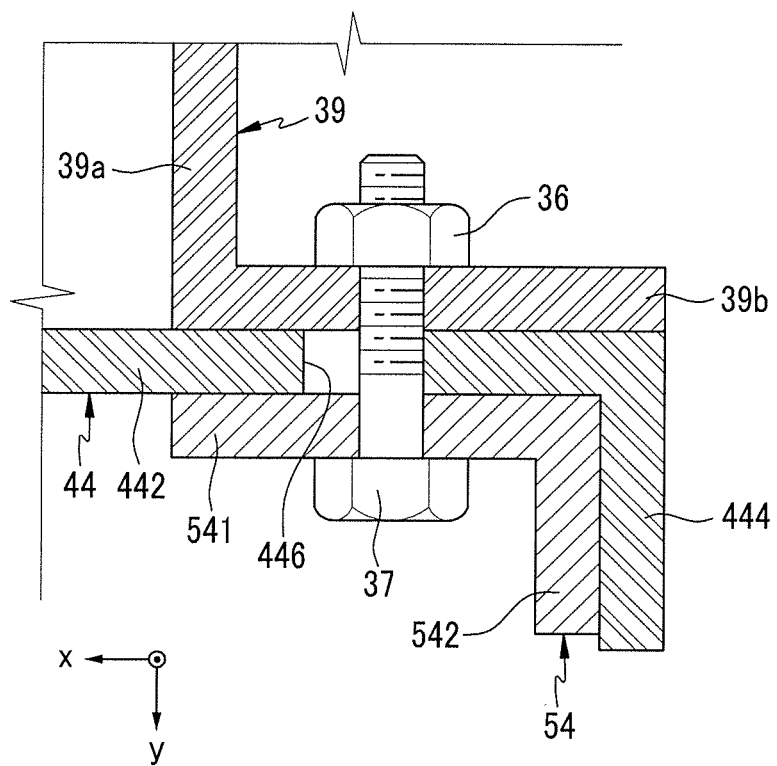
FIG. 8B is a partial cross-sectional view of an end plate pushed from the fixing member in the battery module according to the fourth exemplary embodiment.

In this condition, as shown in FIG. 8B, when the rechargeable batteries 20 are expanded, the end plate 39 is pushed due to the pressure and thus the fastener 37 and the reinforcement member 54 also move together with the end plate 39. The fastener 37 moves until the reinforcement member 54 contacts the support step 444 such that the reinforcement member 54 supports the fastener 37. When the reinforcement member 54 contacts the support step 444, the fastener 37 contacts an inner surface at the external side of the second fixing hole 446.

As described, according to the present exemplary embodiment, when the rechargeable battery 20 expands, the end plate 39 is pushed backward such that excessive pressure due to the expansion of the rechargeable battery 20 can be prevented or reduced, and the end plate 39 is supported by the reinforcement member 54 so that the end plate 39 can be further stably fixed.

While the present invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims and their equivalents.

Description of Some Reference Numerals

| | |
|---|---|
| 101, 102, 103: battery module | |
| 20: rechargeable battery | 21: positive terminal |
| 22: negative terminal | 23: sealing cap |
| 27: vent member | 28: case |
| 29: bus-bar | 34, 39: end plates |
| 34a, 39a: pressing plate | 34b, 39b: fastening plate |
| 34c, 39c: first fixing hole | 36: nut |
| 37: fastener | 38: barrier rib |
| 41, 42, 44: fixing member | |
| 412, 422, 432, 442, 452: support plate | |
| 413: vent hole | 414, 424, 434, 444, 454: support step |
| 416, 426, 436, 446, 456: second fixing hole | |
| 43: upper fixing member | 435: exhaust hole |
| 45: lower fixing member | 51, 52, 53, 54: reinforcement member |
| 513, 523, 533, 543: third fixing hole | 512, 521, 531, 541: base |
| 522, 532, 543: protruding portion | |

What is claimed is:

1. A battery module comprising:
a plurality of rechargeable batteries adjacently arranged along a first direction;
end plates located at and parallel to outer sides of outermost ones of the plurality of rechargeable batteries, the outer sides being orthogonal to the first direction;
fixing members extending lengthwise along the first direction and fixed to the end plates, each of the fixing members being bent at a side end in a direction away from and parallel to the end plates to form a support step protruding from the side end that is parallel to the end plate;
reinforcement members being separate from the fixing members and each of the reinforcement members contacting an outer surface of a corresponding one of the fixing members, the outer surface extending along the first direction; and
a plurality of fasteners fixing the fixing members and the reinforcement members to the end plates, the plurality of fasteners extending along a direction parallel to the end plates;
wherein each of the plurality of fasteners penetrates through a corresponding one of the reinforcement members, a corresponding one of the fixing members, and a corresponding one of the end plates, and
wherein one of the reinforcement members directly contacts the support step of a corresponding one of the fixing members.

2. The battery module of claim 1, wherein one of the reinforcement members is fixed to one of the support steps.

3. The battery module of claim 1, wherein each of the end plates comprises a pressing plate perpendicular to the first direction and a fastening plate extending in the first direction at a side end of the pressing plate, and one of the plurality of fasteners penetrates through one of the fastening plates.

4. The battery module of claim 3, wherein each of the fixing members has a vent hole allowing a coolant to flow between the rechargeable batteries.

5. The battery module of claim 1, wherein each of the end plates comprises a pressing plate perpendicular to the first direction, an upper fastening plate extending in the first direction at an upper end of the pressing plate, a lower fastening plate extending in the first direction at a lower end of the pressing plate, one of the plurality of fasteners penetrates through the upper fastening plate, and another of the plurality of fasteners penetrates through the lower fastening plate.

6. The battery module of claim 1, wherein one of the plurality of fasteners penetrates through a first fixing hole in one of the end plates and a second fixing hole in one of the fixing members, and the second fixing hole is larger than the first fixing hole.

7. The battery module of claim 6, wherein the one of the plurality of fasteners penetrates through a third fixing hole in one of the reinforcement members, and the second fixing hole is larger than the third fixing hole.

8. The battery module of claim 7, wherein the second fixing hole is larger in the first direction than the first fixing hole.

9. The battery module of claim 8, wherein the second fixing hole has first and second portions connected via a third portion that is narrower than each of the first and second portion.

10. The battery module of claim 1, wherein a thickness of one of the reinforcement members is greater than that of one of the fixing members.

11. The battery module of claim 1, wherein one of the reinforcement members is formed of a material that is stronger than that of one of the fixing members.

12. The battery module of claim 1, wherein one of the fixing members comprises a support plate extending in the first direction and a support step protruding from an end of the support plate in a direction perpendicular to the first direction, and a corresponding one of the plurality of fasteners penetrates through a first fixing hole in the support plate.

13. The battery module of claim 12, wherein one of reinforcement members comprises a base and a protruding portion extending from a side end of the base, the protruding portion adjacent and parallel to the support step.

14. The battery module of claim 1, wherein the reinforcement members are slidable with respect to the fixing members.

* * * * *